United States Patent
Suzuki et al.

(10) Patent No.: US 9,588,670 B2
(45) Date of Patent: Mar. 7, 2017

(54) INFORMATION-PROCESSING DEVICE, STORAGE MEDIUM, INFORMATION-PROCESSING METHOD, AND INFORMATION-PROCESSING SYSTEM

(71) Applicant: NINTENDO CO., LTD., Kyoto (JP)

(72) Inventors: Ichiro Suzuki, Kyoto (JP); Wataru Tanaka, Kyoto (JP); Seita Inoue, Kyoto (JP); Ryota Oiwa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 347 days.

(21) Appl. No.: 13/749,144

(22) Filed: Jan. 24, 2013

(65) Prior Publication Data

US 2014/0115533 A1    Apr. 24, 2014

(30) Foreign Application Priority Data

Oct. 23, 2012 (JP) ................. 2012-234078

(51) Int. Cl.
  *G06F 3/048* (2013.01)
  *G06F 3/0488* (2013.01)
  (Continued)

(52) U.S. Cl.
  CPC .......... *G06F 3/0488* (2013.01); *G06F 3/0485* (2013.01); *G06F 3/0486* (2013.01)

(58) Field of Classification Search
  CPC .. G06F 1/1626; G06F 3/04883; G06F 1/1624; G06F 1/1694; G06F 2200/1637; G06F 3/0485; G06F 1/1616; G06F 1/1618; G06F 1/1643; G06F 1/1656; G06F 1/169; G06F 2200/1634; G06F 2200/1636; G06F 3/035; H01L 2924/00; H01L 2224/48247; H01L 2224/48471; H01L 2924/00014; H01L 2224/48479; H01L 2924/01014; H01L 2924/01079
  (Continued)

(56) References Cited

U.S. PATENT DOCUMENTS

2008/0168404 A1    7/2008  Ording
2009/0015559 A1*   1/2009  Day et al. ............... 345/167
  (Continued)

FOREIGN PATENT DOCUMENTS

| EP | 2418571 A1 | 2/2012 |
|---|---|---|
| JP | 2010-515978 | 5/2010 |
| JP | 2012-150558 | 8/2012 |

OTHER PUBLICATIONS

Extended European Search Report in EP Application No. 13152119.7, mailed Aug. 1, 2016, 10 pages.

*Primary Examiner* — Di Xiao
(74) *Attorney, Agent, or Firm* — Nixon & Vanderhye P.C.

(57) ABSTRACT

An exemplary information-processing device includes: an operation receiving unit that receives an operational input made by a user for moving a display area that has area that overlaps with a predetermined area, a display controlling unit that controls a display unit to display a graphic in the display area, and a movement controlling unit that controls movement of the display area in accordance with values derived from the operational input so that the display area moves with a restriction of movement in a predetermined direction when the display area and the predetermined area are in a predetermined positional relation.

16 Claims, 5 Drawing Sheets

(51) Int. Cl.
*G06F 3/0485* (2013.01)
*G06F 3/0486* (2013.01)

(58) Field of Classification Search
USPC ............................... 715/858, 857, 756, 856
See application file for complete search history.

(56) References Cited

U.S. PATENT DOCUMENTS

| | | |
|---|---|---|
| 2011/0090255 A1* | 4/2011 | Wilson et al. ................. 345/647 |
| 2011/0202834 A1* | 8/2011 | Mandryk et al. ............. 715/701 |
| 2012/0026181 A1 | 2/2012 | Wagner et al. |
| 2012/0182324 A1 | 7/2012 | Yano |
| 2013/0198682 A1* | 8/2013 | Matas et al. .................. 715/784 |

\* cited by examiner

INFORMATION-PROCESSING DEVICE,
STORAGE MEDIUM,
INFORMATION-PROCESSING METHOD,
AND INFORMATION-PROCESSING SYSTEM

CROSS REFERENCE TO RELATED
APPLICATIONS

This application is based on and claims priorities under 35 USC 119 from Japanese patent application No. 2012-234078, which was filed on Oct. 23, 2012.

FIELD

This application relates to a user interface.

BACKGROUND AND SUMMARY

There exist in the art technologies for displaying graphics that show objects scrolled in a frame.

The technology herein provides a user with a feeling of comfort in operating a user interface.

There is provided an information-processing device comprising: an operation receiving unit that receives an operational input made by a user for moving a display area that has area that overlaps with a predetermined area, a display controlling unit that controls a display unit to display a graphic in the display area, and a movement controlling unit that controls movement of the display area in accordance with a value derived from the operational input, wherein the movement controlling unit moves the display area with a restriction of movement in a predetermined direction when the display area and the predetermined area are in a predetermined positional relation.

BRIEF DESCRIPTION OF THE DRAWINGS

Exemplary embodiments will be described with reference to the following drawings, wherein:

FIGS. 2A-2C show exemplary situation where area 53 moves in freely-movable area 54 in a comparative example;

DETAILED DESCRIPTION OF NON-LIMITING
EXEMPLARY EMBODIMENTS

1. Overview

Figure 1:
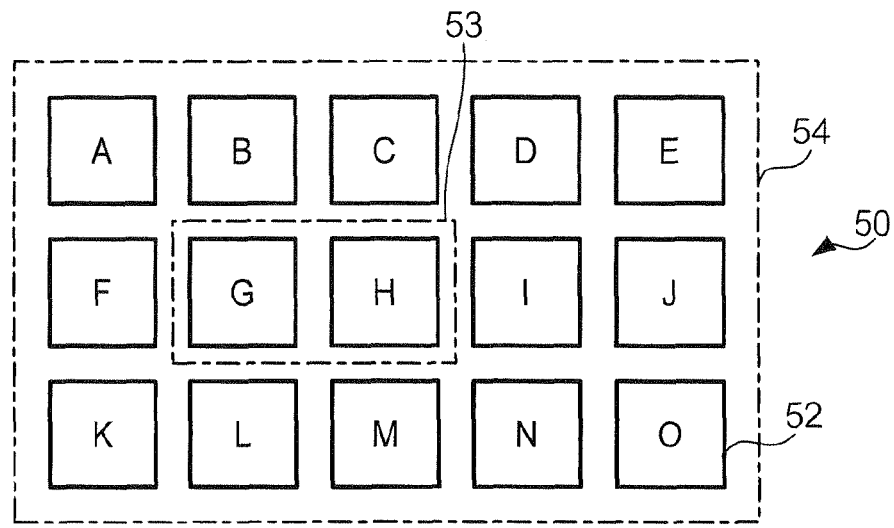
FIG. 1 shown an example of virtual space 50 in an exemplary embodiment.

FIG. 1 is a diagram illustrating an example of virtual space 50 in an exemplary embodiment. Virtual space 50 is a two-dimensional virtual space. Virtual space 50 contains field 51 and objects 52. Field 51 is a virtual plane on which objects are set up in the virtual space. Objects 52 are virtual objects set up in the virtual space, and they may include various sorts of objects that include at least one icon object, character object such as a human, an animal, a monster, etc., an architecture object such as a house, a tower, a castle, etc., a natural object such as a mountain, a river, a tree, a rock, etc., and an artificial object that is not fixed to the field such as an automobile, a brick, etc. In the example illustrated in FIG. 1, plural icon objects are set up as objects 52.

A virtual camera (not shown in the figure) is set up in virtual space 50, and graphics shot virtually by the virtual camera are displayed by a display unit. The virtual camera may be located both inside and outside virtual space 50. Area 53 is the area shot by the virtual camera, and area 53 is displayed by a display device. Area 53 may move in accordance with operational inputs made by a user. More concretely, graphics displayed by the display device may be scrolled in response to the user's operational inputs. Freely-movable portion 54 is set to area 53. Area 53 may move freely in response to operational inputs made by the user when area 53 stays inside freely-movable portion 54. However, movement of area 53 is more restricted when area 53 goes outside freely-movable portion 54 than when area 53 stays inside freely-movable portion 54. It should be noted that area 53 is not totally prohibited to go outside freely-movable portion 54. Namely, at least a portion of area 53 is allowed to go outside freely-movable portion 54 under predetermined conditions.

Figure 2C:
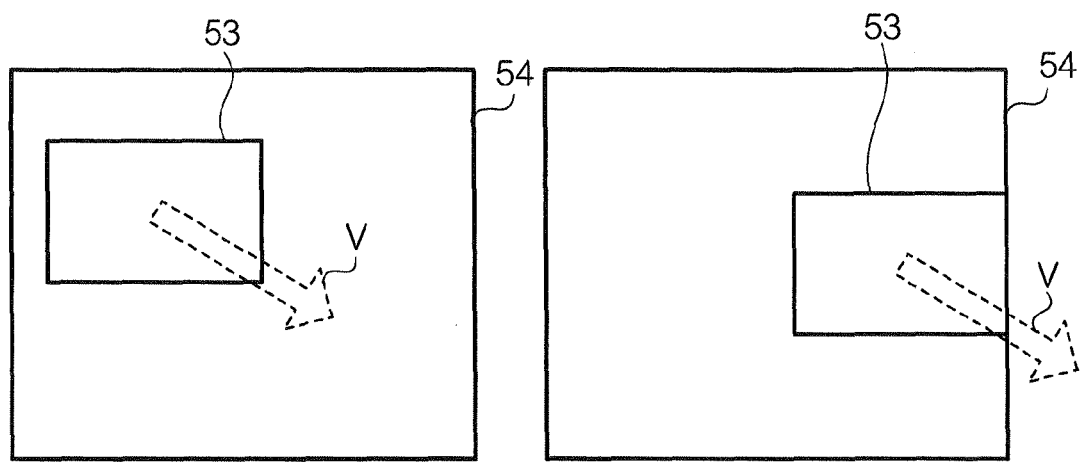
Figure 2C:
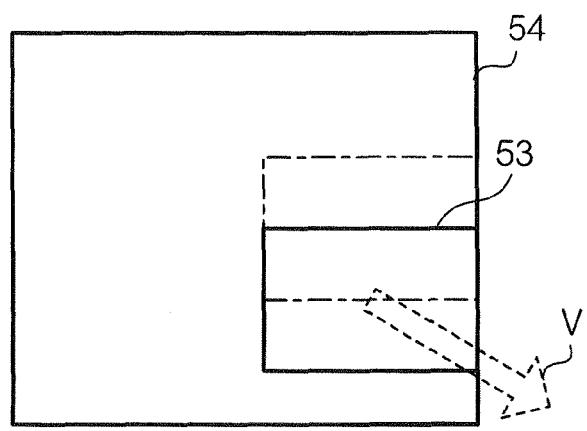

FIGS. 2A-2C show exemplary situations where area 53 moves in freely-movable area 54 in a comparative example. In the comparative example, area 53 moves in a range where area 53 does not go outside freely-movable portion 54. It is supposed that velocity V in the lower right direction is given to area 53 at the position shown in FIG. 2A, and area 53 moves at the velocity. When the right edge of area 53 moving in the lower right direction reaches the right side of freely-movable portion 54 as shown in FIG. 2B, area 53 is not allowed to move further in the right direction. In this situation, when the calculated or virtual velocity of movement given to area 53 in the lower right direction is not zero, i.e. both of rightward component and downward component of the velocity of movement are not zero, because, for example, an operational input instructing to move area 53 in the lower right direction is made, area 53 moves only downward since area 53 is not allowed to move rightward as shown in FIG. 2C. In this example, area 53 may move in a direction that the user does not expect.

Figure 3A:
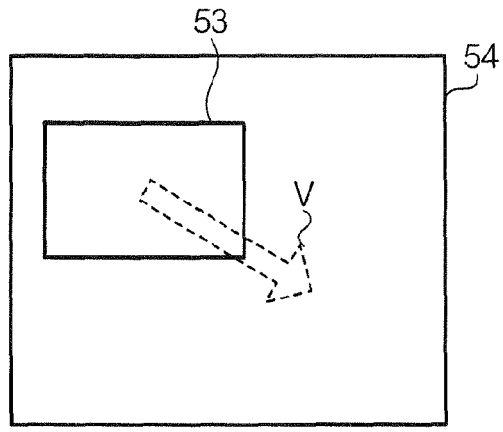
FIGS. 3A-3D show exemplary situation where area 53 moves in freely-movable area 54 in an exemplary embodiment.
Figure 3B:
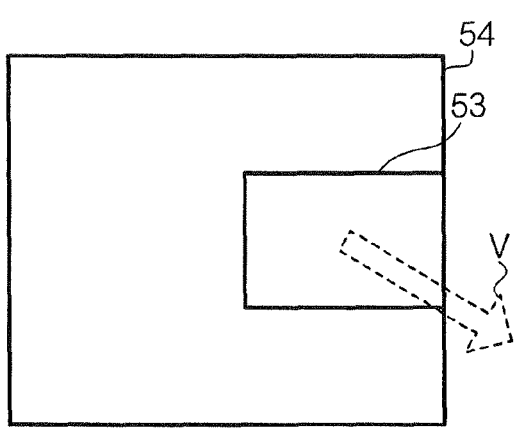
Figure 3C:
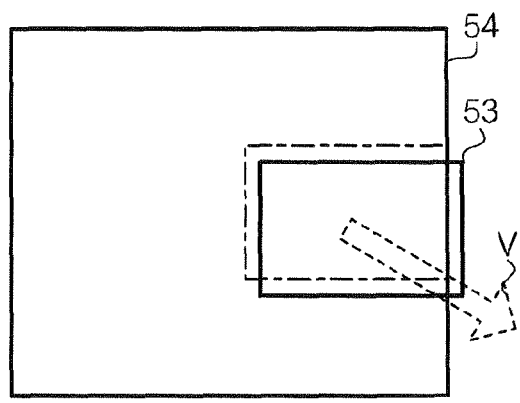
Figure 3D:
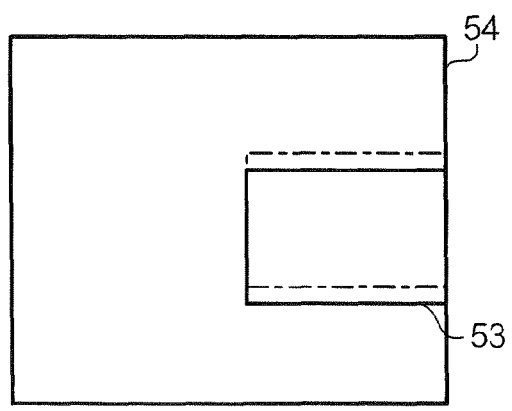

FIGS. 3A-3D show exemplary situations where area 53 moves in freely-movable area 54 in an exemplary embodiment. FIG. 3A and FIG. 3B are the same as FIG. 2A and FIG. 2B respectively. In the situation shown in FIG. 3B, namely, in a case where area 53 has a velocity of movement in the lower right direction when area 53 reaches the right edge of freely-movable portion 54, area 53 moves downward. In this case, displacement in the downward direction is more restricted than in the case shown in FIG. 2C. Moreover, in this case, area 53 also moves in the right direction with a certain restriction as shown in FIG. 3C. After Area 53 goes outside freely-movable portion 54, area 53 moves back inside freely-movable portion 54 as shown in FIG. 3D. Namely, when the velocity of movement given to area 53 becomes zero, area 53 moves back to a position where area 53 stays inside freely-movable portion 54. In this example, movement of area 53 in a direction that the user does not expect is restricted. In the following paragraphs, configurations and operations of a device that provides a user interface behaving in the above-explained manner are explained.

2. Configuration

Figure 4:
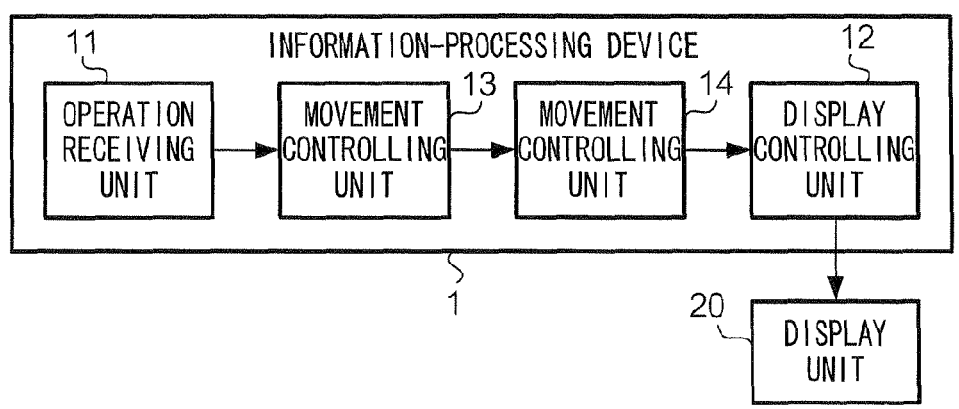
FIG. 4 shows an example of a functional configuration of information-processing device 1 of the exemplary embodiment.

FIG. 4 is a diagram illustrating a functional configuration of information-processing device 1 of the exemplary embodiment. Information-processing device 1 has operation receiving unit 11, display controlling unit 12, and movement controlling unit 13. Operation receiving unit 11 receives operational inputs made by the user for moving area 53 that is a part of a predetermined area, i.e. virtual space 50 in this case. Display controlling unit 12 instructs display unit 20 to display graphics positioned in area 53 of virtual space 50. Display unit 20 is a functional component that displays at least one of a letter and an image, and in this exemplary embodiment, display unit 20 is realized by a device different from information-processing device 1. Movement controlling unit 13 moves area 53 in accordance with values derived from operational inputs made by the user. Movement controlling unit 13 moves the display area with a restriction in a predetermined direction when area 53 and virtual space 50 are in a predetermined positional relation. In this exemplary embodiment, the predetermined positional relation is a relation that area 53 is at a position where area 53 starts to go outside freely-movable portion 54. Moreover, in this exemplary embodiment, the predetermined direction is a direction that intersects a direction in which area 53 goes outside freely-movable portion 54.

Figure 5:
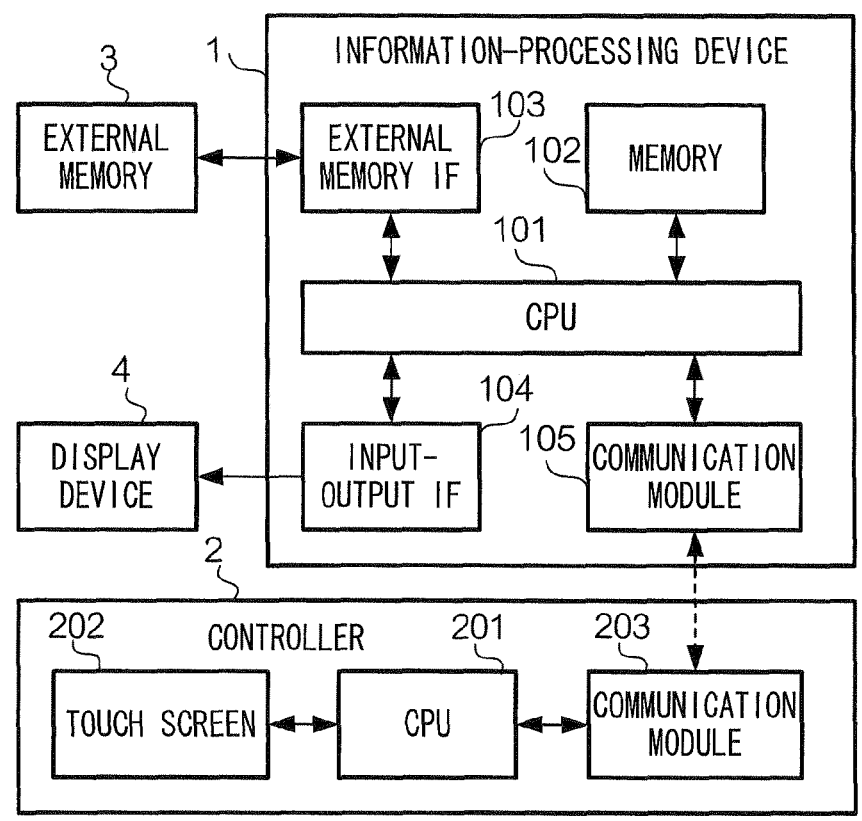
FIG. 5 shows an example of a hardware configuration of information-processing device 1.

FIG. 5 is a diagram illustrating a hardware configuration of information-processing device 1. In this exemplary embodiment, information-processing device 1 is a gaming device that provides its user with video games. Information-processing device 1 is a computer device that has CPU 101, memory 102, external memory IF 103, input-output IF 104, and communication module 105. Controller 2 is a device used by the user to operate information-processing device 1. Information-processing device 1 is connected to display device 4. Display device 4 is a device that displays information including at least one of a letter and an image, and it has a display, such as a liquid crystal panel, an organic EL (Electro-Luminescence) panel, etc., and a drive circuit. In this exemplary embodiment, information-processing device 1 is a stationary type of gaming device, and display device 4 is not built into information-processing device 1. Namely, display device 4 is an external device of information-processing device 1, such as a TV set. However, information-processing device 1 may have display device 4 built in.

CPU 101 is a device that controls other components of information-processing device 1, and it carries out various sorts of computing. Memory 102 is a data storing device that stores data including programs, and it has, for example, a RAM (Random Access Memory) and ROM (Read Only Memory). External memory IF 103 is an interface that reads data including programs from external memory 3 and writes data including programs to external memory 3. External memory 3 is a memory, such as an optical disc, a magnetic disc, or a semiconductor memory, that stores data such as game programs. Input-output IF 104 is an interface that communicates data with an input-output device, i.e. display device 4 in this case. Communication module 105 is a device that communicates data with controller 2, and it has, for example, an antenna and an amplifier. When a program such as a game program stored by external memory 3 or memory 102 is executed, the function in accordance with the program such as a video game is realized in information-processing device 1.

Controller 2 is a device that provides information-processing device 1 with instructions. In this exemplary embodiment, controller 2 also has a function of displaying graphics in accordance with data transmitted from information-processing device 1. Controller 2 has CPU 201, touch screen 202, and communication module 203. CPU 201 is a device that controls other components of controller 2, and it carries out various sorts of computing using a memory (not shown). Touch screen 202 is a device that has both a function of displaying information and a function of receiving instructions made by a user. Touch screen 202 has, for example, a display, a drive circuit, and a touch sensor panel placed on a surface of the display. Communication module 203 is a device that communicates data with information-processing device 1, and has, for example, an antenna and an amplifier.

In this exemplary embodiment, information-processing device 1 provides a function of displaying graphics in area 53 of virtual space 50 using at least one of display device 4 and touch screen 202 by executing processing in accordance with programs such as game programs, system software, and combinations of these programs stored by external memory 3 or memory 102. Area 53 moves in virtual space 50 in accordance with operational inputs made by the user via controller 2. CPU 101 that executes the programs is an example of operation receiving unit 11, display controlling unit 12, and movement controlling unit 13. At least one of display device 4 and touch screen 202 is an example of display unit 20.

3. Process

Figure 6:
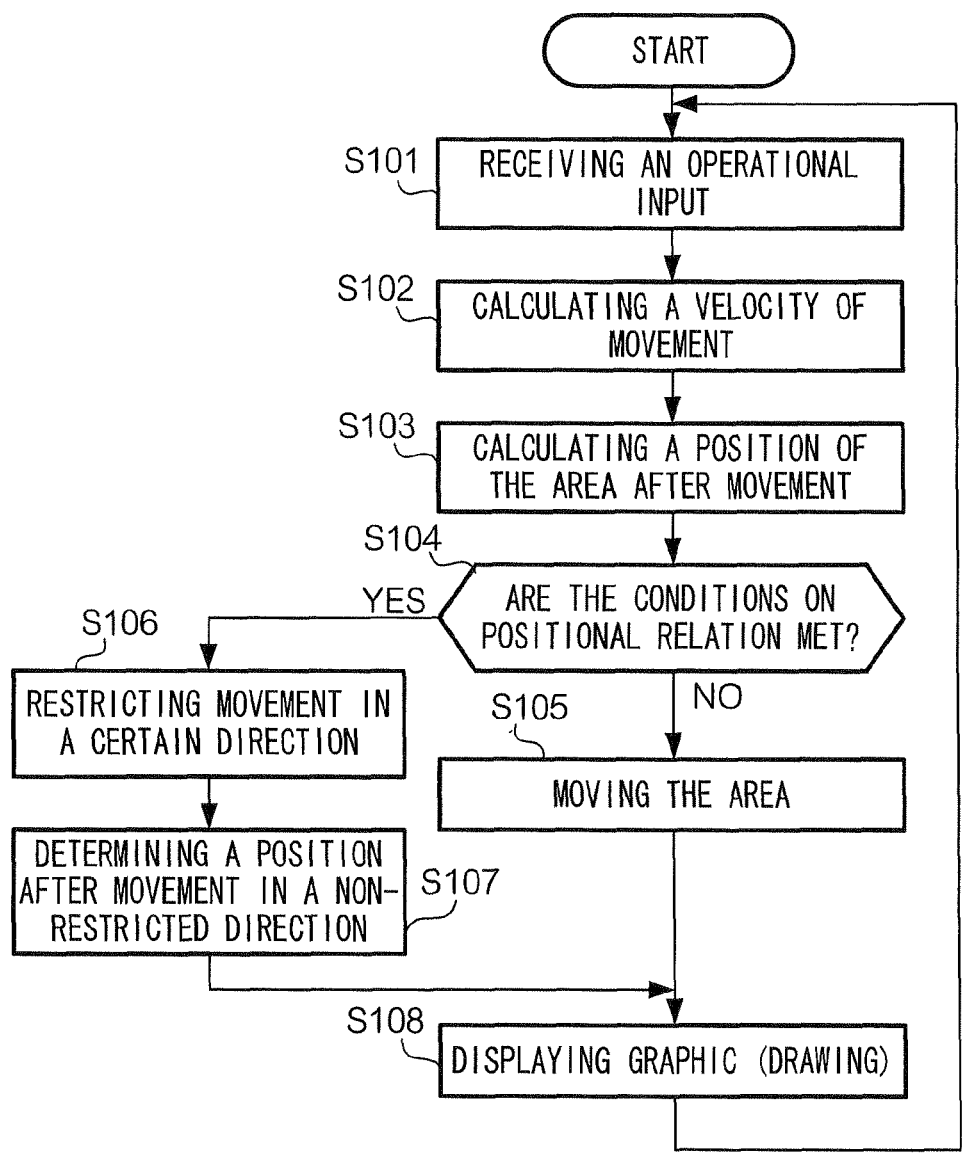
FIG. 6 shows an example of a flowchart illustrating a process conducted by information-processing device 1.

FIG. 6 is a flowchart illustrating a process conducted by information-processing device 1. When the process illustrated by FIG. 6 is carried out, a program for displaying graphics in area 53 of virtual space 50 is in execution. Now, a process that is carried out when graphics in area 53 is displayed by touch screen 202 and instructions in accordance with operational inputs made to touch screen 202 by the user are input to information-processing device 1 is explained. In this example, the process illustrated by FIG. 6 is repeatedly executed at a fixed time interval, such as every 16.7 milliseconds, i.e. 60 Hz. In the following explanation, the fixed time interval is referred to as a "frame."

The user may make operational inputs to touch screen 202 by actions called "drag" and "flick." Drag is an action whereby the user slides one of his/her fingers on touch screen 202, i.e. to move a position of contact between the finger and touch screen 202 keeping the contact. Flick is an action whereby the user sweeps one of his/her fingers quickly on touch screen 202, i.e. to drag at a velocity quicker than a threshold velocity and set the finger apart from touch screen 202. In accordance with operational inputs made by these actions, the velocity of movement of area 53 is determined, and graphics in area 53 moving at the velocity of movement are displayed.

In step S101, CPU 101 receives an operational input. More concretely, the following operations are carried out. When the user operates controller 2, controller 2 outputs data in accordance with the operational input made by the user, which data is referred to as "operational input data" hereinafter. The operational input data indicates coordinates of a position in touch screen 202 at which the user's finger contacts with touch screen 202. The coordinates are referred to as "real coordinates" hereinafter. In the case where touch screen 202 is not touched by a finger of the user in the current frame, the operational input data indicates a null value. CPU 101 converts the real coordinates to coordinates indicating a point in virtual space 50. The coordinates indicating the position in virtual space 50 are referred to as "virtual coordinates" hereinafter, and a point indicated by virtual coordinates is referred to as a "virtual point" hereinafter.

Memory 102 stores virtual coordinates that indicate positions of touches made in a certain period in the past in the order of frames in which the coordinates were generated. The certain period may be, for example, a period from a frame in which the current drag or flick started to the last frame, i.e. the current frame. CPU 101 continually writes the virtual coordinates in the current frame to memory 102.

In step S102, CPU 101 calculates a velocity of movement of area 53. In this exemplary example, CPU 101 calculates the velocity of movement of area 53 by use of at least one set of virtual coordinates from among the plural sets of virtual coordinates stored by memory 102. The velocity of movement may be calculated in accordance with various methods. For example, the velocity of movement may be calculated by multiplying a total sum of values indicated by operational inputs made in the past by a predetermined coefficient. Alternatively, the velocity of movement may be calculated by multiplying a vector from a starting position of a drag to a terminal position of the drag by a predetermined coefficient, multiplying a velocity of movement in the previous frame by a predetermined coefficient, and summing the vector and the velocity of movement multiplied by the coefficients. It should be noted that the velocity of movement may alternatively be calculated by any way other than these examples.

In step S103, CPU 101 calculates a position (more precisely a candidate of a position) of area 53 after movement. The calculation of the position after movement is performed based on the current position of area 53, the velocity of movement, and the length of frame. The position of area 53 is specified by the position of a particular point in area 53 such as the upper left corner point of area 53.

In step S104, CPU 101 judges whether the position of area 53 after movement and the position of freely-movable portion 54 meet a predetermined positional relation. In this example, the predetermined positional relation is that the edge of area 53 after movement is positioned outside freely-movable portion 54. For example, CPU 101 judges whether at least one of the following conditions is met:

$x1 < xmin$                           Condition (1):

$x2 > xmax$                        Condition (2):

$y1 < ymin$                         Condition (3):

$y2 > ymax$                        Condition (4):

In the above conditions, x1 and x2 are x-coordinates at the left edge and the right edge of area 53 after movement, respectively, and y1 and y2 are y-coordinates of the bottom edge and top edge of area 53 after movement respectively. Then, xmin and xmax are x-coordinates at the left edge and the right edge of freely-movable portion 54 respectively, and ymin and ymax are y-coordinates at the bottom edge and the top edge of freely-movable portion 54 respectively. In this example, the right direction is the positive direction of x-axis, and the upward direction is the positive direction of y-axis. When CPU 101 judges that area 53 and freely-movable portion 54 meet at least any one of conditions (1) to (4) (S104: Yes), CPU 101 moves its operation to step S106. When CPU 101 judges that area 53 and freely-movable portion 54 do not meet any one of conditions (1) to (4) (S104: No), CPU 101 moves its operation to step S105.

In step S105, CPU 101 moves area 53 to the position that CPU 101 calculated in step S103. After completing the process of step S105, CPU 101 moves its operation to step S108.

In step S106 and step S107, CPU 101 specifies sets of coordinates in a particular direction and in a direction that is not the particular direction, which is referred to as "non-particular direction" hereinafter, respectively. Namely, in step S106, CPU 101 specifies only sets of coordinates in the particular direction, and in step S107, CPU 101 specifies only sets of coordinates in the non-particular direction. In step S106, CPU 101 restricts movement of area 53 in the direction corresponding to the condition of positional relation that CPU 101 judged to be met in step S106. The direction in which movement of area 53 is restricted is the particular direction (an example of the predetermined direction). The direction corresponding to the condition of positional relation is a direction that is different from the direction in which the edge of area 53 goes beyond the edge of freely-movable portion 54. Namely, in this example, the particular direction is a direction perpendicular to the direction in which area 53 goes outside freely-movable portion 54. For example, when condition (1) or condition (2) is met, the particular direction is y-direction, and when condition (3) or condition (4) is met, the particular direction is x-direction. When a condition (1) or (2) and a condition (3) or (4) are met at the same time, no particular direction is specified, i.e. none of x-direction and y-direction is the particular direction.

CPU 101 restricts movement of area 53 in the particular direction in accordance with, for example, the following formula.

$$pr(j) - p(j-1) = k\{pc(j) - p(j-1)\} \quad\quad \text{Formula (5):}$$

When formula (5) is solved for pr(j), the following formula is given.

$$pr(j) = k \times pc(j) + (1-k) \times p(j-1) \quad\quad \text{Formula (6):}$$

CPU 101 specifies a set of coordinates calculated in accordance with formula (6) as a set of coordinates of area 53 in the particular direction. In the above formulas, pr(j) is a set of coordinates indicating a position of area 53 after movement with the restraint in the j-th frame (the current frame), pc(j) is a set of coordinates indicating a position of area 53 after movement calculated in step S103 in the j-th frame, p(j−1) is a set of coordinates indicating a position of area 53 in the (j−1)-th frame (the frame just before the current frame), and k is a coefficient determining a degree of restraint given to movement of area 53 that is referred to as "restraint coefficient" hereinafter. In this example, coefficient k is determined in accordance with a distance in the non-particular direction between area 53 and freely-movable portion 54. In any direction other than the non-particular direction, no offset by a coefficient is made.

Figure 7A:
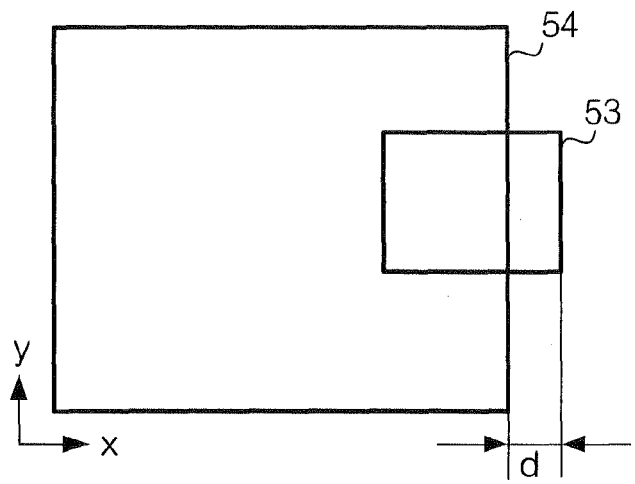
FIGS. 7A and 7B show examples of distances between area 53 and freely-movable portion 54.
Figure 7B:
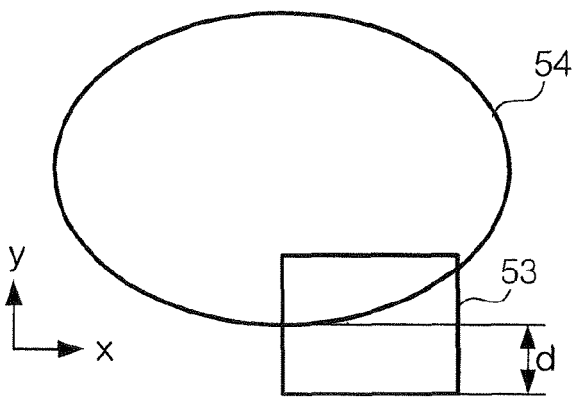

FIGS. 7A and 7B show examples of a distance between area 53 and freely-movable portion 54. In the examples, the distance between area 53 and freely-movable portion 54 is defined as a distance between an edge of area 53 and an edge of freely-movable portion 54. More concretely, the distance is defined as a difference between the maximum (or minimum) coordinate value of the portion of area 53 that is located outside freely-movable portion 54 in a direction in which area 53 goes beyond the edge of freely-movable portion 54, and the maximum (or minimum) coordinate value of freely-movable portion 54 in the direction. In the example shown by FIG. 7A, area 53 goes beyond freely-movable portion 54 in the positive direction of x-axis, and a difference between the maximum x-coordinate value of area 53 and the maximum x-coordinate value of freely-movable portion 54 is defined as distance d between area 53 and freely-movable portion 54. FIG. 7B illustrates an example where the shape of freely-movable portion 54 is not a rectangle. In this example, area 53 goes beyond freely-movable portion 54 in the negative direction of y-axis, and a difference between the minimum y-coordinate value of area 53 and the minimum y-coordinate value of freely-movable portion 54 is defined as distance d between area 53 and freely-movable portion 54. In the following explanation, the distance between area 53 and freely-movable portion 54 is referred to as a "volume of intrusion" since the distance indicates to what extent area 53 intrudes the outside of freely-movable portion 54.

Figure 8:
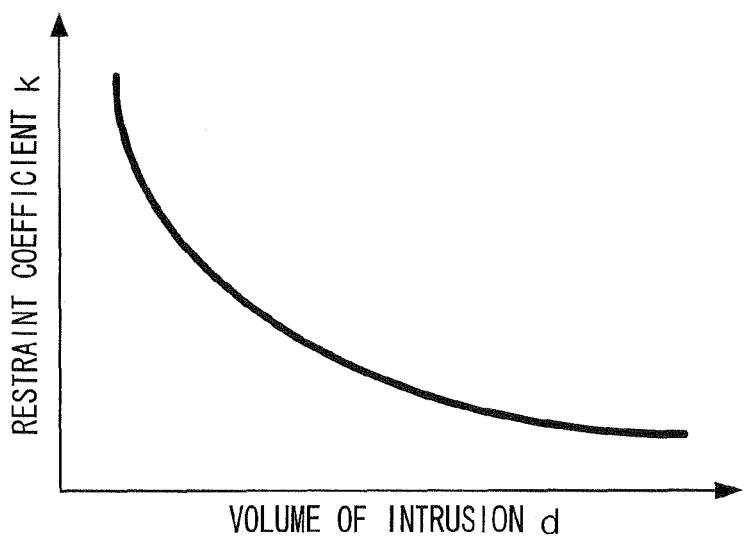
FIG. 8 shows an example of a graph illustrating how the restraint coefficient varies depending on a volume of intrusion.

FIG. 8 is a graph illustrating how restraint coefficient varies depending on volume of intrusion. The vertical axis of the graph indicates restraint coefficient k, and the horizontal axis of the graph indicates volume of intrusion d in the non-particular direction. In this example, coefficient k is more than 0 and less than 1, i.e. $0<k<1$, and the smaller the value of k is, the more strongly movement of area 53 is restricted. In this example, the larger volume of intrusion in the non-particular direction (for example, x-direction) is, the more strongly movement of area 53 in the particular direction (for example, y-direction) is restricted. In this example, since coefficient k is less than 1, movement of area 53 is restricted so that a displacement in the particular direction in a case where area 53 and freely-movable portion 54 are in the predetermined positional relation, is smaller than a displacement in the particular direction in a case where area 53 and freely-movable portion 54 are not in the predetermined positional relation. Moreover, since coefficient k is larger than 0 in this example, area 53 moves, i.e. displacement of area 53 in the particular direction is not zero, even though movement of area 53 is restricted.

FIG. 6 is referred to again. In step S107, CPU 101 determines a position after movement in the non-particular direction. Namely, CPU 101 determines a displacement of area 53. The position after movement in the non-particular direction is normally the position that was calculated in step S103. However, in a case where volume of intrusion d exceeds threshold thd (the upper limit), CPU 101 modifies the position after movement so that volume of intrusion d does not exceed threshold thd. For example, CPU 101 modifies the position calculated in step S103 so that volume of intrusion d becomes equal to threshold thd, i.e. d=thd, in the case where volume of intrusion d exceeds threshold thd. In this example, threshold thd relating to volume of intrusion, i.e. an acceptable volume of intrusion, is determined in accordance with the velocity of movement (more precisely, the component of the velocity of movement in the non-particular direction) calculated in step S102. More concretely, CPU 101 determines threshold thd so that the higher the velocity of movement is, the larger threshold thd is.

When the edge of area 53 is located outside freely-movable portion 54, CPU 101 executes a process for reducing the velocity of movement of area 53 to set the velocity of movement lower than the velocity of movement when area 53 stays in freely-movable portion 54. The process for reducing the velocity of movement may include, for example, a process for changing a coefficient used in a formula for calculating the velocity of movement in the direction for reducing the velocity of movement, a process for generating a virtual operational input instructing to reduce the velocity of movement of area 53, or a combination of these operations.

In step S108, CPU 101 outputs to touch screen 202 a data set indicating a graphic in area 53, whose position is specified by the coordinates stored by memory 102, and instructs touch screen 202 to display the graphic. Touch screen 202 displays the graphic in accordance with the data set received from CPU 101 via communication module 105 and communication module 203. In the following frame, CPU 101 repeats the series of processes in steps S101 to S108 for the frame.

As explained above, in accordance with the present exemplary embodiment, movement of area 53 in a direction that the user does not expect is restricted when the user makes an operational input to move area 53 near the border of freely-movable portion 54.

4. Modifications

The technology herein should not be limited to the above-explained exemplary embodiment, and may be modified in various ways. In the following section, some examples of modifications are explained. It should be noted that two or more of the following examples of modifications may be combined.

4-1. Modified Example 1

The predetermined positional relation used as the condition, by which it is determined whether movement of area 53 in the predetermined direction is restricted, is not limited to the positional relation that area 53 is at a position from which area 53 starts to go outside freely-movable portion 54. For example, the predetermined positional relation may be a positional relation that area 53 is located in freely-movable portion 54. In such a case, the particular direction and the non-particular direction may be determined in advance, or they may be dynamically determined in accordance with, for example, operational input made by the user. Moreover, in the case, movement controlling unit 13 may judge whether movement of area 53 in the particular direction should be restricted or not based on the calculated velocity of movement (or displacement) of area 53, and conduct the restriction of movement of area 53 when movement controlling unit 13 judges that the movement should be restricted. More concretely, for example, movement controlling unit 13 may judge that movement of area 53 in the particular direction should be restricted when the velocity of movement of area 53 is higher than a predetermined threshold. Alternatively, for example, movement controlling unit 13 may judge that movement of area 53 in the particular direction should be restricted when the displacement of area 53 is larger than a predetermined threshold.

4-2. Modified Example 2

The way to move area 53 in the non-particular direction when area 53 and freely-movable portion 54 meet the predetermined positional relation should not be limited to the way used in the above-explained exemplary embodiment. Namely, in the above-explained exemplary embodiment, area 53 is allowed to go outside freely-movable portion 54 with a certain restriction, but, for example, movement of area 53 in the non-particular direction may be restricted so that area 53 does not go outside freely-movable portion 54.

4-3. Modified Example 3

Coefficient k should not be limited to the coefficient having the character illustrated in FIG. 8. For example, restraint coefficient k may change linearly or discontinuously depending on volume of intrusion. Moreover, restraint coefficient k may be a function of velocity of movement or displacement of area 53 in addition to (or instead of) volume of intrusion.

4-4. Modified Example 4

The particular direction should not be limited to a direction orthogonally crossing the non-particular direction. Any direction that intersects the non-particular direction (any direction that is not parallel to the first direction) may be defined as the particular direction. Moreover, the coordinate system used for specifying a position in virtual space 50 should not be limited to the orthogonal coordinate system.

4-5. Modified Example 5

The definition of distance between area 53 and freely-movable portion 54 should not be limited to the definition used in the above-explained exemplary embodiment. For example, the distance between area 53 and freely-movable portion 54 may be defined as the distance between any particular point of area 53 and any particular point of freely-movable portion 54. The particular points of area 53 and freely-movable portion 54 may be, for example, their center of gravity, one of their vertexes, a predetermined point on a predetermined side of them, etc.

4-6. Modified Example 6

The relation between operational inputs and directions of movement of area 53 should not be limited to the relation used in the above-explained exemplary embodiment. For example, CPU 101 may determine the velocity of movement to be in the same direction as that of drag or flick made by the user.

4-7. Modified Example 7

The hardware configurations of information-processing device 1 or the other devices should not be limited to the hardware configurations used in the above-explained exemplary embodiment. For example, controller 2 may not have touch screen 202. In such a case, controller 2 may have a keypad and/or buttons, and provide information-processing device 1 with operational input data indicating a key or button that is pressed by the user. For example, controller 2 may include an acceleration sensor, and provide information-processing device 1 with operational input data indicating a sensed acceleration, i.e. indicating an action made to controller 2, such as swinging controller 2 around, by the user.

4-8. Modified Example 8

The flow of process executed by information-processing device 1, the parameters and the formulas used in each component of the process, etc., used in the exemplary embodiment are examples, and they do not limit the technology herein. For example, some of the steps shown in the flowchart of FIG. 6 may be skipped, or their order changed, etc.

4-9. Other Modified Examples

Virtual space 50 should not be limited to a two-dimensional virtual space. Namely, virtual space 50 may be a virtual space of three or more dimensions. Moreover, area 53 should not be limited to a part of a virtual space. Area 53 may be a part of a real space.

Information-processing device 1 should not be limited to a stationary type of gaming device. Information-processing device 1 may be any type of information-processing device other than a gaming device, such as a mobile gaming device, a personal computer, a mobile phone, PDA (Personal Digital Assistant), a tablet type terminal device, etc. The application program executed in information-processing device 1 should not be limited to a gaming application program. Any application program other than a gaming application program, such as a text-editing application program, a lesson-providing application, etc., may be executed in information-processing device 1. Moreover, a part of functions provided by information-processing device 1 explained in the above exemplary embodiment may be provided by a server device that communicates with information-processing device 1 via a network. In such a case, an information-processing system that has the server device and information-processing device 1 provides the functions explained in the exemplary embodiment.

The application program that is executed by information-processing device 1 should not be limited for distribution to a user being to be stored in a computer-readable non-transitory recording medium. The application program may be distributed to the user by being downloaded to the user's information-processing device via a network such as the Internet. Similarly, the system software of information-processing device 1 may be provided stored in a computer-readable non-transitory recording medium or may be downloaded to the information-processing device of the user.

What is claimed is:

1. An information-processing device comprising:
a processing system that includes at least one hardware processor coupled to a display device, the processing system configured to:
receive an operational input made by a user for moving a display area that overlaps with a predetermined area;
control a display screen to display a graphic in the display area;
control the display area to move within the predetermined area in accordance with a value derived from the operational input;
determine that the display has reached an edge, or gone outside, of the predetermined area; and
responsive to the determination of the display area reaching the edge, or going outside in a first direction the predetermined area:
(1) restrict, within a predetermined range, a distance of movement of the display area in (a) the first direction and (b) another direction that is inverse to the first direction,
(2) decrease a distance of movement of the display area in a second direction as compared with movement of the display area in the second direction before the display area was determined to have reached the edge in the first direction of the predetermined area, the second direction being perpendicular to the first direction.

2. The information-processing device according to claim 1, wherein determination that the display area has reached the edge includes a determination that the display area is at a position where the display area starts to go outside the predetermined area.

3. The information-processing device according to claim 2, wherein
movement of the display area is restricted in a direction intersecting with a direction in which the display area has been determined to be outside the predetermined area.

4. The information-processing device according to claim 1, wherein
movement of the display area is restricted in accordance with a distance between the display area and the predetermined area.

5. The information-processing device according to claim 1, wherein
movement of the display area is increasingly restricted as a distance the display area and the predetermined area is increased.

6. The information-processing device according to claim 1, wherein
movement of the display area is restricted such that a displacement in the first direction when the display area and the predetermined area are in a predetermined positional relation is smaller than a displacement in the first direction when the display area and the predetermined area are not in the predetermined positional relation.

7. The information-processing device according to claim 1, wherein
the display area is moved with the restriction of movement in the first direction when an edge of the display area and an edge of the predetermined area are in a predetermined positional relation.

8. The information-processing device according to claim 1, wherein
after the display area is moved out of the predetermined area in a range where a distance between an edge of the display area and an edge of the predetermined area do not exceed a threshold, the display area is moved back inside the predetermined area.

9. The information-processing device of claim 1, wherein the first and second directions are coordinate directions.

10. The information-processing device of claim 1, wherein (1) and (2) are performed responsive to the determination of the display area is outside the predetermined area in a first direction, and while the display area is determined to remain outside of the predetermined area in the first direction.

11. A computer-readable non-transitory storage medium storing a program causing a computer device to execute a process, the process comprising:
receiving an operational input made by a user for moving a display area that overlaps with a predetermined area;
controlling a display screen to display a graphic in the display area;
controlling movement of the display area in accordance with a value derived from the operational input;
determining that the display has reached, overlaps, or passed, an edge of the predetermined area in a first direction;
responsive to the determination:
(1) automatically decreasing a distance of movement of the display area in a second direction as compared with movement of the display area in the second direction before the display area was determined to have reached, overlap, or passed the edge in the first direction, the second direction being perpendicular to the first direction, the distance of movement that the display area is automatically decreased to being a non-zero amount; and
(2) restricting, within a predetermined range, a distance of movement of the display area in (a) the first direction and (b) another direction that is inverse of the first direction.

12. The computer-readable non-transitory storage medium of claim 11, wherein the first and second directions are coordinate directions.

13. A method performed on a computer system that includes at least one hardware processor, the method comprising:
receiving an operational input made by a user for moving a display area that overlaps with a predetermined area,
controlling a display device to display a graphic in the display area, and
controlling movement of the display area in accordance with values derived from the operational input;
determining that the display has reached an edge of the predetermined area; and
responsive to the determination of the display area reaching the edge of the predetermined area in a first direction:
restricting, within a predetermined range, a distance of movement of the display area in (a) a first direction and (b) another direction that is inverse of the first direction, and
decreasing a distance of movement of the display area in a second direction as compared with movement of the display area in the second direction before the display area was determined to have reached the edge of the predetermined area in the first direction, the second direction being perpendicular to the first direction and the distance of movement of the display area in the second direction being a non-zero amount.

14. The method of claim 13, wherein the first and second directions are coordinate directions.

15. A computer system comprising:
a display device that includes a display screen;
a user input device configured to accept input provided by a user; and
a processing system that includes at least one hardware processor coupled to the display device and the user input device, the processing system configured to:
receive, via the user input device, an operational input made by the user for moving a display area that overlaps with a predetermined area;
control the display device to display a graphic in the display area;
control movement of the display area in accordance with a value derived from the operational input;
determine that the display has reached, or overlaps, an edge of the predetermined area in a first direction; and
responsive to the determination:
automatically decrease a distance of movement that the display area is to move in a second direction as compared with movement of the display area in the second direction before the display area was determined to have reached or overlap the edge of the predetermined area in the first direction, the second direction intersecting the first direction, the first direction being a direction in which the display area is determined to be outside the edge of the predetermined area, the distance of movement the display area is to be moved in the second direction being a non-zero amount, and restrict, within a predetermined range, a distance of movement of the display area in (a) the first direction and (b) another direction that is inverse of the first direction.

16. The computer system of claim 15, wherein the first and second directions are coordinate directions of an x, y coordinate system.

* * * * *